(12) United States Patent
Marcks Von Würtemberg

(10) Patent No.: US 9,961,630 B2
(45) Date of Patent: May 1, 2018

(54) HANDLING MODES IN A WIRELESS DEVICE

(71) Applicant: TELEFONAKTIEBOLAGET L M ERICSSON (PUBL), Stockholm (SE)

(72) Inventor: Hannes Marcks Von Würtemberg, Västra Frölunda (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 12 days.

(21) Appl. No.: 14/762,361

(22) PCT Filed: Feb. 1, 2013

(86) PCT No.: PCT/EP2013/052000
§ 371 (c)(1),
(2) Date: Jul. 21, 2015

(87) PCT Pub. No.: WO2014/117856
PCT Pub. Date: Aug. 7, 2014

(65) Prior Publication Data
US 2015/0365891 A1 Dec. 17, 2015

(51) Int. Cl.
*G08C 17/00* (2006.01)
*H04W 52/02* (2009.01)
(Continued)

(52) U.S. Cl.
CPC ... *H04W 52/0206* (2013.01); *H04W 52/0212* (2013.01); *H04W 52/0216* (2013.01);
(Continued)

(58) Field of Classification Search
None
See application file for complete search history.

(56) References Cited

U.S. PATENT DOCUMENTS

2006/0194581 A1  8/2006  Kang et al.
2007/0230394 A1* 10/2007  Wang ............... H04J 11/0069
                                                        370/328
(Continued)

FOREIGN PATENT DOCUMENTS

EP  1796293 A2  6/2007

OTHER PUBLICATIONS

International Search Report and Written Opinion issued in corresponding application No. PCT/EP2013/052000, dated Nov. 27, 2013, 14 pages.

*Primary Examiner* — Jutai Kao
(74) *Attorney, Agent, or Firm* — Sage Patent Group

(57) ABSTRACT

The embodiments herein relate to method in a node (105, 110) for handling modes in the wireless device (105). The node (105, 110) and wireless device (105) are comprised in a wireless network (100). The wireless device (105) is in active mode. The node (105, 110) obtains information indicating that the wireless device (105) should reduce its radio power consumption. The node (105, 110) determines that the wireless device (105) should change from active mode to a first power saving mode based on the obtained information and based on a first criterion. And, the node (105, 110) or the wireless device (105) determines that the wireless device (105) should change from active mode to a second power saving mode based on the obtained information and based on a second criterion.

21 Claims, 8 Drawing Sheets

(51) Int. Cl.
*H04W 68/02* (2009.01)
*H04W 88/10* (2009.01)

(52) U.S. Cl.
CPC ... *H04W 52/0235* (2013.01); *H04W 52/0254* (2013.01); *H04W 68/02* (2013.01); *H04W 76/28* (2018.02); *H04W 52/0258* (2013.01); *H04W 88/10* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/21* (2018.01); *Y02D 70/24* (2018.01)

(56) References Cited

U.S. PATENT DOCUMENTS

| | | | | |
|---|---|---|---|---|
| 2008/0218209 | A1* | 9/2008 | Lee | H04W 76/046 326/56 |
| 2009/0061799 | A1* | 3/2009 | Park | H04W 52/0258 455/127.5 |
| 2012/0323391 | A1* | 12/2012 | Drake | H04L 12/2827 700/296 |
| 2013/0210493 | A1* | 8/2013 | Tal | H04W 52/0261 455/566 |
| 2014/0193150 | A1* | 7/2014 | Mukai | H04L 12/44 398/67 |

* cited by examiner

HANDLING MODES IN A WIRELESS DEVICE

CROSS REFERENCE TO RELATED APPLICATION(S)

This application is a 35 U.S.C. § 371 National Phase Entry Application from PCT/EP2013/052000, filed Feb. 1, 2013, the disclosure of which is incorporated by reference.

TECHNICAL FIELD

Embodiments herein relate generally to a node and a method in the node. More particularly the embodiments herein relate to handling modes in a wireless device.

BACKGROUND

In a typical communications network, also referred to as e.g. a wireless communications network, a wireless communications system, a communications network, a communications system or a wireless network, a wireless device communicates via a Radio Access Network (RAN) to one or more Core Networks (CNs).

The wireless device may be a device by which a subscriber may access services offered by an operator's network and services outside operator's network to which the operator's radio access network and core network provide access, e.g. access to the Internet. The wireless device may be any device, mobile or stationary, enabled to communicate over a radio channel in the wireless network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device may be portable, pocket storable, hand held, computer comprised, or vehicle mounted devices, enabled to communicate voice and/or data, via the radio access network, with another entity, such as another wireless device or a server.

The wireless device is enabled to communicate wirelessly in the wireless network. The communication may be performed e.g. between two wireless devices, between a wireless device and a regular telephone and/or between the wireless device and a server via the radio access network and possibly one or more core networks and possibly the internet.

The wireless network covers a geographical area which is divided into cell areas. Each cell area is served by a base station. The base station may be referred to as e.g. evolved Node B (eNB), eNodeB, NodeB, B node, Base Transceiver Station (BTS), Radio Base Station (RBS), depending on the technology and terminology used. The base station communicates over the air interface with the wireless device(s) within range of the base station.

The wireless network further comprises network nodes such as Serving GateWay (SGW), Packet data network GateWay (PGW), Mobility Management Entity (MME), Home Subscriber Server (HSS) etc.

Today wireless networks suffer from an increasing signaling load. This is mainly due to wireless devices frequently going online to download updates etc. for applications and features.

To save radio power consumption, e.g. battery consumption, the wireless device may quickly disable its radio whenever possible. This may be done by setting the wireless device in power saving modes such as idle mode or connected mode. A mode may also be referred to as a state. When the wireless device is not in the idle mode or the connected mode, it may be in active mode and it is actively connected to the base station, i.e. it is not in any power saving mode. The active mode may also be referred to as awake mode. The connected mode may also be referred to as a discontinuous reception mode, in which the wireless device performs discontinuous reception when saving radio power consumption. The connected mode may be DRX in connected mode if the wireless network is a Long Term Evolution (LTE) network or URA-PCH if the wireless network is a 3G network, e.g. Universal Mobile Telecommunications System (UMTS). DRX is short for discontinuous reception. URA is short for Universal terrestrial radio access network (UTRAN) Registration Area and PCH is short for Paging CHannel.

If the need to save radio power consumption is signalled as the idle mode to the wireless device, it will lead to that all resources related to the wireless device are being released in the base station. Next time the wireless device comes online, i.e. enters active mode, all these resources have to be recreated. This causes signaling load in the wireless network.

DRX and URA-PCH may be used both in connected mode or idle mode. However, the embodiments herein relate to DRX in connected mode and URA-PCH in connected mode. If the need to save radio power consumption is signalled as the DRX in connected mode or URA-PCH in connected mode to the wireless device, the wireless device effectively stays connected with the base station, while the radio in the wireless device is turned off. This will not release resources in the base station, and signaling is kept to a minimum. DRX in connected mode and URA-PCH in connected mode may however cause more signaling, since handover must be done for all movements around the wireless network. Handover may be described as transfer of ongoing data session for a wireless device from one base station to another base station. DRX in connected mode and URA-PCH in connected mode is a process of turning off the radio receiver in the wireless device when it does not expect to receive incoming data. When the wireless device is in DRX in connected mode and URA-PCH in connected mode, its radio is periodically and momentarily switched on, to check for any pending downloads from the wireless network. Connected mode may also be referred to as sleep mode. This reduces the radio power consumption which extends the battery life of the wireless device. DRX in connected mode should not be mixed up with DRX in idle mode in which the wireless device may be set into after a time of air interface inactivity.

SUMMARY

An object of embodiments herein is therefore to obviate at least one of the above disadvantages and to provide reduced radio power consumption in the wireless device.

According to a first aspect, the object is achieved by a method in a node for handling modes in the wireless device. The node and the wireless device are comprised in a wireless network. The wireless device is in active mode. The node obtains information indicating that the wireless device should reduce its radio power consumption. The node determines that the wireless device should change from active mode to a first power saving mode based on the obtained information and based on a first criterion. The node determines that the wireless device should change from active mode to a second power saving mode based on the obtained information and based on a second criterion.

According to a second aspect, the object is achieved by the node for handling modes in the wireless device. The node and wireless device are comprised in the wireless network. The wireless device is in active mode. The node comprises an obtaining unit which is adapted to obtain information indicating that the wireless device should reduce its radio power consumption. The node comprises a determining unit adapted to determine that the wireless device should change from active mode to a first power saving mode based on the obtained information and based on a first criterion, and to determine that the wireless device should change from active mode to a second power saving mode based on the obtained information and based on a second criterion.

Since either the first power saving mode and second power saving mode are used based on criterions such as the mobility of the wireless device, the type of wireless device, the load in the wireless network, the network signalling may be reduced at the same time as radio power consumption of the wireless device is reduced.

Embodiments herein afford many advantages, of which a non-exhaustive list of examples follows:

An advantage of the embodiments herein may be that, if they are implemented in a node which is a network node, it will apply to all wireless devices in the wireless network. This makes big savings in signaling capacity in the wireless network.

Another advantage of the embodiments herein may be that, if they are implemented in a node which is the wireless device, both network signaling and battery of the wireless device are minimized. This may be independently of if the embodiments herein are also implemented in the network node.

A further advantage is that the embodiments herein minimize network signaling while also reducing radio power consumption in the wireless device.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to that, based on information indicating that the of the wireless device should reduce its power consumption and based on a criterion, the wireless device uses either a first power saving mode or a second power saving mode to reduce radio power consumption. The first power saving mode may be an idle mode. The second power saving mode may be a connected mode such as DRX in connected mode or URA-PCH in connected mode. For example, if the criterion is based on the mobility of the wireless device, i.e. if the wireless device is associated with a handover in the wireless network, the first power saving mode is advantageous since no handover is needed until the next time the wireless device goes online. If the wireless device is not associated with a handover, the second power saving mode is advantageous since it will keep the resources associated with the wireless device allocated on the nearest base station, in turn causing minimal signaling as the radio of the wireless device goes up and down. The network node may control all this, since it knows the mobility pattern of the wireless device, and based on this the network node may set the power policy to be used by the wireless device. The wireless device may also control all or part of this by itself. Furthermore, the criterion may instead or also be based on the type of wireless device or the data traffic load in the wireless network.

Figure 1:
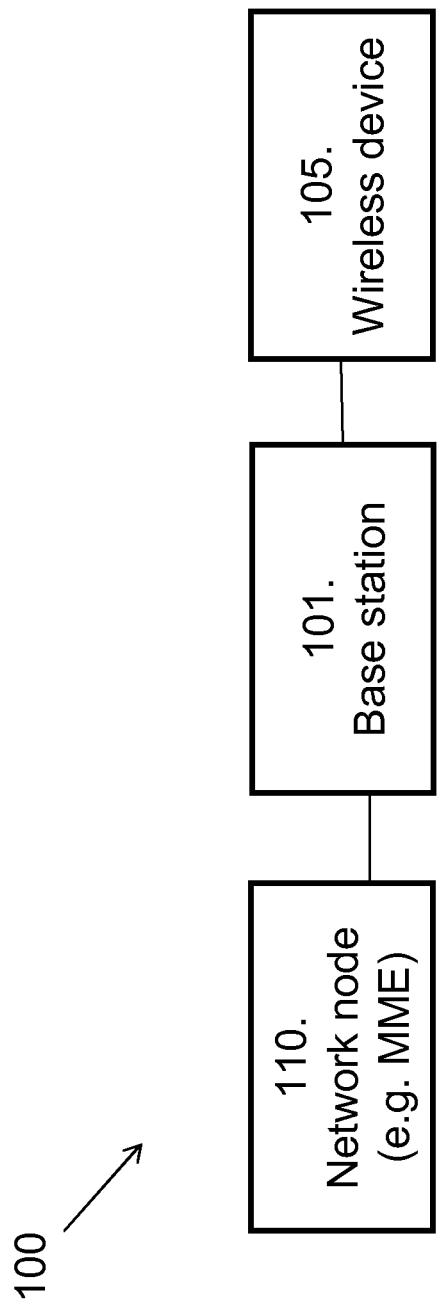
FIG. 1 is a schematic block diagram illustrating embodiments of a wireless network.

FIG. 1 depicts a wireless network 100 in which embodiments herein may be implemented. The wireless network 100 may in some embodiments apply to one or more radio access technologies such as for example LTE, LTE Advanced, Wideband Code Division Multiple Access (WCDMA), Global System for Mobile Communications (GSM), 4G, any other Third Generation Partnership Project (3GPP) radio access technology, or other radio access technologies such as WLAN also referred to as WiFi.

The wireless network 100 comprises a base station 101 serving a cell. The base station 101 may be a base station such as a NodeB, eNodeB, or any other network node capable of communicating over a radio carrier with a wireless device 105 being present in the cell and served by the base station 101.

The wireless device 105 may be a device by which a subscriber may access services offered by an operator's network and services outside operator's network to which the operator's radio access network and core network provide access, e.g. access to the Internet. The wireless device 105 may be any device, mobile or stationary, enabled to communicate over a radio channel in the wireless network, for instance but not limited to e.g. user equipment, mobile phone, smart phone, sensors, meters, vehicles, household appliances, medical appliances, media players, cameras, M2M device, or any type of consumer electronic, for instance but not limited to television, radio, lighting arrangements, tablet computer, laptop or PC. The wireless device 105 may be stationary, portable, pocket storable, hand held, computer comprised, or vehicle mounted devices, enabled to communicate voice and/or data, via the radio access network, with another entity, such as another wireless device or a server.

The wireless network 100 further comprises a network node 110 such as an MME 401 or an SGW 405. The reference numbers 401 and 405 refer to FIG. 4, which will be described below. The MME 401 is a node in the wireless network 100 which is responsible for tracking and paging procedures for wireless devices in idle mode. The MME 401 also handles bearer activation and deactivation procedures. Furthermore, the MME 401 is responsible for authenticating the wireless device 105 towards the HSS. The MME 401 also authorizes the wireless device 105 to the Public Land Mobile Network (PLMN) and NAS signaling and signaling security. The MME 401 also provides the control plane function for mobility between LTE and 2G/3G networks by the S3 interface. In some embodiments, the MME 401 is a combined SGSN and MME, i.e. the Serving GPRS Support Node (SGSN) and the MME are co-located in one node, where GPRS is short for General packet radio service. The SGW 405 is a node in the wireless network 100 which terminates the interface towards the radio access network, i.e. the base station 101. The SGW 405 is responsible for handovers with neighboring base stations, also for packet routing and forwarding.

In the following, the term "node" together with the reference numbers 105 and 110 refers to either the network node 110 or the wireless device 105.

Figure 2:
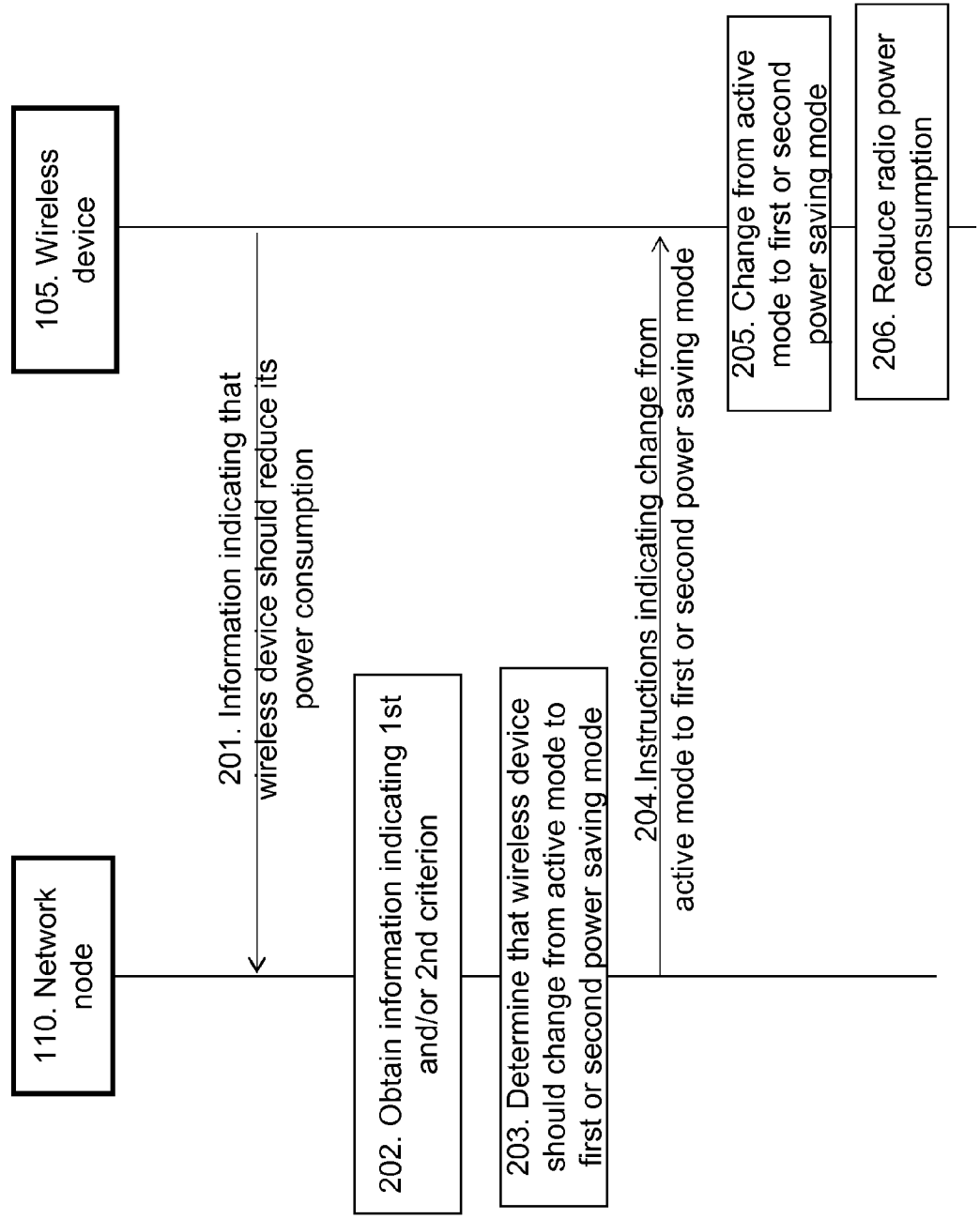
FIG. 2 is a signaling diagram illustrating embodiments of a method in the network node.

The method for handling modes in the wireless device 105 according to some embodiments will now be described with reference to the combined signaling diagram and flowchart depicted in FIG. 2. FIG. 2 illustrates an embodiment where the node 105, 110 is represented by the network node 110, i.e. when the method is performed by the network node 110. Therefore, the term network node 110 is used instead of node 105, 110 when describing FIG. 2. In FIG. 2, the wireless device 105 is in active mode at the start of the method, i.e. before step 201 takes place. The method in FIG. 2 comprises the following steps, which steps may as well be carried out in another suitable order than described below:

Step 201

The network node 110 obtains information indicating that wireless device 105 should reduce its power consumption by receiving the information from the wireless device 105.

Step 202

The network node 110 obtains information indicating whether the wireless device 105 fulfills a first criterion or a second criterion. For example, if the first criterion and the second criterion is associated with the mobility of the wireless device 105, the network node 110 obtains information indicating whether the wireless device is associated with a handover or not, for example by examining recent handovers carried out for the wireless device 105 within a certain time limit. If no recent handovers were seen in the time limit, the wireless device 105 may be considered not moving or substantially not moving. The time limit may be predefined. If the wireless device 105 has recently been involved in a handover within the time limit, is currently involved in an ongoing handover or will be involved in a handover in near future, the wireless device 105 may be considered to be moving. In another example, if the first and second criterions are associated with a type of wireless device 105, the network node 110 obtains information indicating whether the wireless is of one type or another type. In a further example, if the first and second criterions are associated with a load situation in the wireless network 100, the network node 110 obtains information indicating whether the load is below a load threshold or if it has reached a load threshold.

Step 203

Based on the information received in step 201 and on the information obtained in step 202, the network node 110 determines that mode of the wireless device 105 should be changed from active mode to the first power saving mode or from active mode to the second power saving mode. The first power saving mode may be idle mode. The second power saving mode may be DRX in connected mode or URA-PCH in connected mode. In the following, when term second power saving mode is used it refers to any of the DRX in connected mode or URA-PCH in connected mode.

The second power saving mode may also be referred to as a low-power connected mode, a power reduced connected mode, a power save connected mode or a green connected mode, i.e. a mode in which the wireless device 105 reduces its radio power consumption.

If the first criterion is that the wireless device 105 is associated with a handover in the wireless network 100, the network node 110 determines that the mode should be changed from active mode to the first power saving mode. So, if the wireless device 105 is associated with a handover in the wireless network 100, the first power saving mode mode is better than the second power saving mode since no handover is needed until the next time the wireless device 105 goes online.

If the second criterion is that the wireless device 105 is not associated with a handover in the wireless network 100, i.e. any ongoing or soon to be or recent handover, the network node 110 determines that the mode should be changed from active mode to the second power saving mode. So, if the wireless device 105 is not associated with a handover in the wireless network 100, the second power saving mode is better than the first power saving mode since it will keep the resources associated with the wireless device 105 allocated on the nearest base station 101. This will in turn cause minimal signaling as the radio of the wireless device 105 goes up and down.

If the first and second criterions are associated with the type of wireless device, the network node 100 determines that the mode should be changed from active mode to the first power saving mode when the wireless device 105 is of a first type and that it should change from active mode to the second power saving mode when the wireless device is different from the first type.

If the first and second criterions are associated with the load situation in the wireless network 100, the network node 100 determines that the mode should be changed from active mode to the first power saving mode when the load is below a threshold and that it should change from active mode to the second power saving mode when the load has reached or is above the threshold.

Step 204

When the network node 110 has determined that the mode should be changed from active mode to the first power saving mode or the second power saving mode, the network node 110 transmits instructions indicating the change from active mode to the first power saving mode or instructions indicating the change from active mode to the 30 second power saving mode to the wireless device 105.

Step 205

When the wireless device 105 has received the instructions in step 204, the wireless device 105 changes its mode from active mode to the first power saving mode, or from active mode to the second power saving mode according to the instructions.

When the wireless device 105 enters the first power saving mode, the base station 101 releases all resources associated with the wireless device 105, and its associated core network resources are released When the wireless device 105 uses the second power saving mode, its associated network resources remain active and the signalling impact is therefore very small as the wireless device 105 goes between the second power saving mode and active mode. The wireless device 105 remains in the second power saving mode until it changes back to active mode, i.e. when the wireless device 105 remains in the second power saving mode until it needs to receive data packets again and therefore changes back to active mode. In some embodiments, the mode of the wireless device 105 does not change to the first power saving mode after having been in the second power saving mode. In some embodiments, if the wireless device 105 in the second power saving mode goes through a handover, the wireless device 105 may change to the first power saving mode instead. The wireless device 105 may then change to the first power saving mode based on its own decision or based on instructions from the network node 110. This is because the wireless device 105 may be seen as moving when it is in a handover, instead of substantially not moving.

Step 206

When the mode has changed from active mode to the first power saving mode, or from active mode to the second power saving mode, the wireless device 105 reduces its radio power consumption by for example deactivating its radio power consuming unit(s). The radio power consuming unit(s) may not be permanently deactivated when radio power consumption is reduced, but they may be activated once in a while. The radio power consuming unit may be for example a radio module such as a radio receiver.

Figure 3:
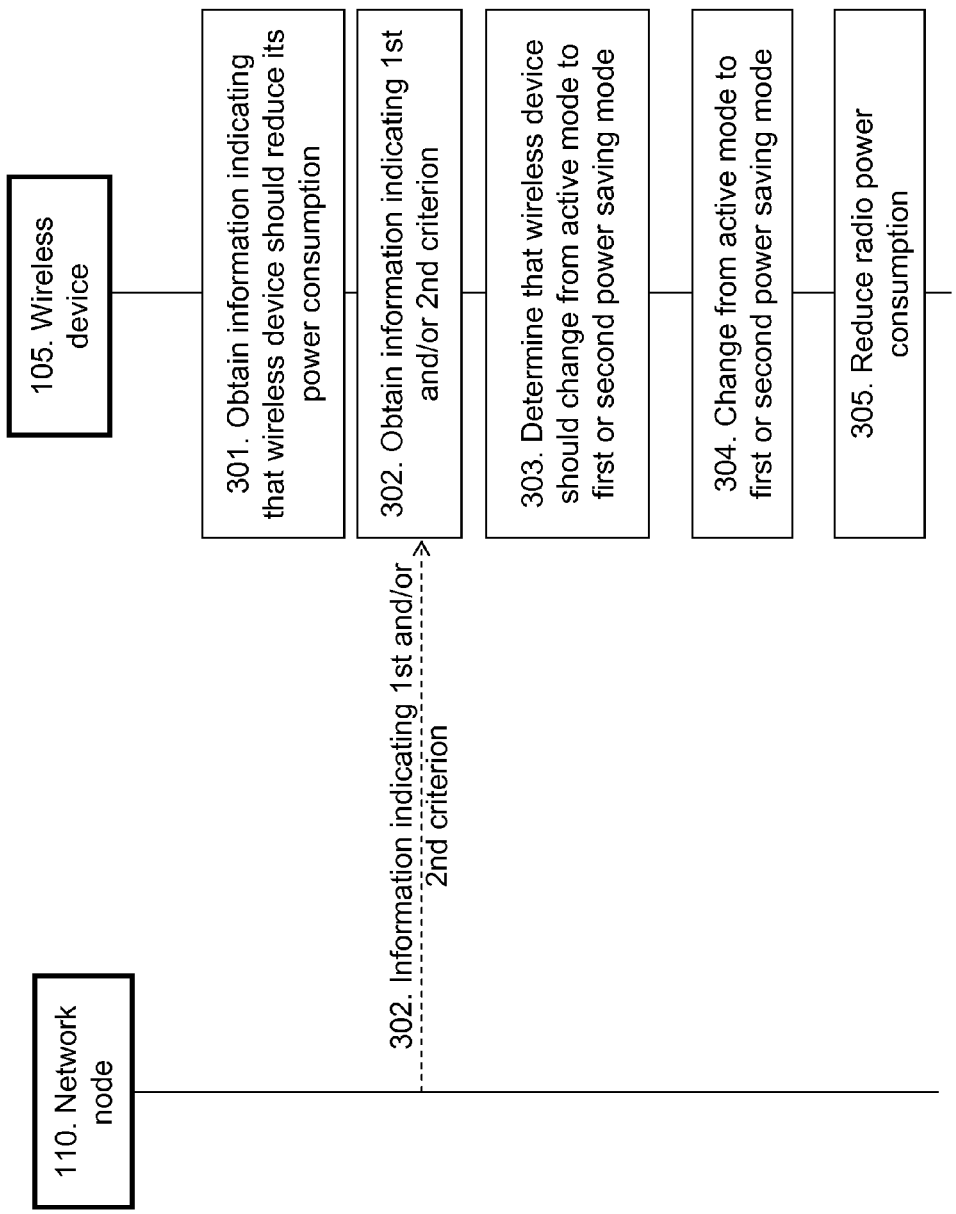
FIG. 3 is a signaling diagram illustrating embodiments of a method in the wireless device.

The method for handling power consumption in the wireless device 105 according to some embodiments will now be described with reference to the combined signaling diagram and flowchart depicted in FIG. 3. FIG. 3 illustrates an embodiment where the node 105, 110 is represented by the wireless device 105, i.e. when the method is performed by the wireless device 105. Therefore, the term wireless device 105 is used instead of node 105, 110 when describing FIG. 3. As in FIG. 2, the wireless device 105 is in active mode at the start of the method, i.e. before step 301 takes place. The method in FIG. 3 comprises the following steps, which steps may as well be carried out in another suitable order than described below:

Step 301

This step corresponds to step 201 in FIG. 2. The wireless device 105 obtains information indicating that wireless device 105 should reduce its power consumption by receiving the information internally within the wireless device 105.

Step 302

This step corresponds to step 202 in FIG. 2. The wireless device 105 obtains information indicating whether it fulfills a first criterion or a second criterion. For example, if the first criterion and the second criterion is associated with the mobility of the wireless device 105, the wireless device 105 obtains information indicating whether it is associated with a handover or not associated with a handover in the wireless network 100, for example by examining recent handovers carried out for the wireless device 105 within a certain time limit. The time limit may be predefined. If no recent handovers were seen in the time limit, the wireless device 105 is not associated with a handover. If the wireless device 105 has recently been involved in a handover in the time limit, is currently involved in an ongoing handover or will be involved in a near future handover, the wireless device 105 is considered to be in a handover. In another example, if the first and second criterions are associated with a type of wireless device 105, the wireless device 105 obtains information indicating whether it is of one type or another type. In a further example, if the first and second criterions are associated with a load situation in the wireless network 100, the wireless device 105 obtains information indicating whether the load is below a load threshold or if it has reached a load threshold.

In some embodiments, the wireless device 105 may obtain this information by receiving it from the network node 110, as indicated with the dotted line in FIG. 3. In the mobility case, the network node may detect the mobility of the wireless device 105 and transmit this information to the wireless device 105. In some embodiments, the wireless device 105 obtains the information internally within the wireless device 105 itself.

Step 303

This step corresponds to step 203 in FIG. 2. Based on the information received in step 301 and on the information in step 302, the wireless device 105 determines that mode of the wireless device 105 should be changed from active mode to the first power saving mode or from active mode to the second power saving mode. As mentioned above, the first power saving mode may be idle mode and the second power saving mode may be DRX in connected mode or URA-PCH in connected mode. The decision is also taken based on the mobility of the wireless device 105 or the type of wireless device or the load situation in the wireless network 100.

If the first criterion is that the wireless device 105 is associated with a handover in the wireless network 100, the wireless device 105 determines that the mode should be changed from active mode to the first power saving mode, i.e. the wireless device 105 is not currently involved in an ongoing handover or will be involved in a handover in near future, the wireless device 105 may be considered to be moving. If the wireless device 105 is associated with a handover, the first power saving mode is better than the second power saving mode since no handover is needed until the next time the wireless device 105 goes online. When the wireless device 105 is moving in the wireless network 100 it may be in a handover, and the decision to change from active mode to the first power saving mode may therefore also be seen as done when the wireless device is in the handover.

If the second criterion is that the wireless device 105 is not associated with a handover in the wireless network 100, the wireless device 105 determines that the mode should be changed from active mode to the second power saving mode. If the wireless device 105 is not associated with a handover, the second power saving mode is better than the first power saving mode since it will keep the resources associated with the wireless device 105 allocated on the nearest base station 101, in turn causing minimal network signaling as the radio of the wireless device 105 goes up and down. When the wireless device 105 is not moving in the wireless network 100 it is not in a handover, and the decision to change from active mode to the second power saving mode may therefore also be seen as done when the wireless device has not recently been involved in a handover. As mentioned above, the handover may be a currently ongoing handover, a handover in near future or a recent handover, If the first and second criterions are associated with the type of wireless device, the wireless device 105 determines that the mode should be changed from active mode to the first power saving mode when the wireless device 105 is of a first type and that it should change from active mode to the second power saving mode when the wireless device is different from the first type.

If the first and second criterions are associated with the load situation in the wireless network 100, the wireless device 105 determines that the mode should be changed from active mode to the first power saving mode when the load is below a threshold and that it should change from active mode to the second power saving mode when the load has reached or is above the threshold.

Step 304

This step corresponds to step 205 in FIG. 2. When the wireless device 105 has determined that the mode should change in step 303, the wireless device 105 changes its mode from active to the first power saving mode or the second power saving mode.

When the wireless device 105 enters the first power saving mode, the base station 101 releases all resources associated with the wireless device 105, and its associated core network resources are released.

When the wireless device 105 uses the second power saving mode, its associated network resources remain active, and the signalling impact is therefore very small as the wireless device 105 goes between the second power saving mode and active. The wireless device 105 remains in the second power saving mode until it changes back to active mode, i.e. when the wireless device 105 remains in the second power saving mode until it needs to receive data packets again and therefore changes back to active mode.

In some embodiments, the mode of the wireless device 105 does not change to the first power saving after having been in the second power saving mode. In some embodiments, if the wireless device 105 in the second power saving mode goes through a handover, the wireless device 105 may change to the first power saving mode instead. The wireless device 105 may then change to the first power saving based on its own decision or based on instructions from the network node 110. This is because the wireless device 105 may be seen as moving when it is in a handover, instead of not moving.

Step 305

This step corresponds to step 206 in FIG. 2. When the mode has changed to the first power saving mode or the second power saving mode, the wireless device 105 reduces its radio power consumption by for example deactivating its radio power consuming unit(s). The radio power consuming unit(s) may not be permanently deactivated when radio power consumption is reduced, but they may be activated once in a while. The radio power consuming unit may be for example a radio module such as a radio receiver.

As mentioned above, the node 105, 110 may be the network node or the wireless, i.e. the embodiments herein may be implemented in the network node 110 or they may be implemented in the wireless device 105. These two embodiments will now be described.

Network Node Implementation

This relates to the case when the node 105, 110 is represented by the network node 110. By considering the mobility of the wireless device 105, the type of wireless device or the load situation in the wireless network 100, the network node 110, e.g. MME 401, or SGW 405, may apply different power policies to the wireless device 105 causing it to prefer the first power saving mode or the second power saving mode for saving radio power.

When the criterion is related to mobility, if the wireless device 105 mainly stays around one base station 101, i.e. is not associated with a handover, the network node 110 instructs the wireless device 105 to use the second power saving mode. If the wireless device 105 is moving between base stations, e.g. between the base station 101 and another base station(s) and is associated with a handover, the network node 110 instructs the wireless device 105 to use the first power saving mode instead.

Wireless Device Implementation

This relates to the case when the node 105, 110 is represented by the wireless device 105. Instead of having the network node 110 controlling the power saving model in the wireless device 105, this may instead be controlled from within the wireless device 105 itself.

For the mobility case, if the wireless device 105 detects movement through the wireless network 100, i.e. the wireless device 105 is associated with a handover, it may switch to using the first power saving mode. This reduces signaling in the core network. If the wireless device 105 remains with the same base station and is not associated with a handover, e.g. the base station 101, it switches to using the second power saving mode instead, which causes the core network to maintain all resources associated with the wireless device 105 when the radio of the wireless device 105 goes into low power mode.

Figure 4:
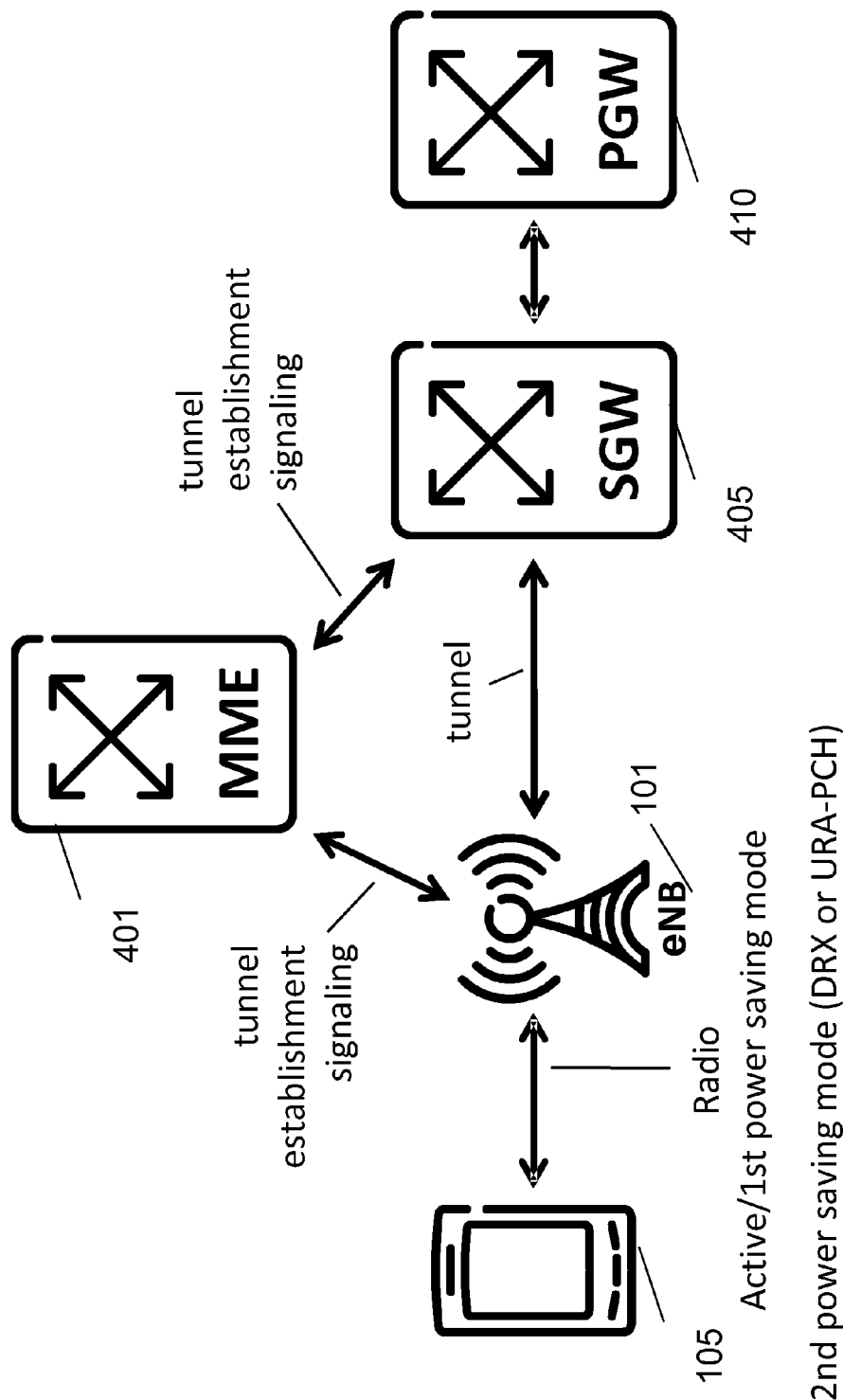
FIG. 4 is a schematic block diagram illustrating embodiments of a wireless network.

FIG. 4 is a schematic block diagram illustrating an embodiment of the wireless network 100. The wireless network 100 comprises the wireless device 105 and the base station 101, as also shown in FIG. 1 and described above. In FIG. 4, the network node 110 is represented by an MME 401, an SGW 405 and a PGW 410. The PGW 410 is a node in the wireless network 100 which acts as the anchor point for wireless mobility, and handles IP address allocation for the wireless device 105. The PGW 410 provides connectivity from the wireless device 105 to an external Packet Data Network (PDN) which is the point of entry or exit of traffic for the wireless device 105. The wireless device 105 is served by the base station 101, represented by an eNB in FIG. 4.

The base station 101 has setup a tunnel for the wireless device 105 towards the SGW 405. The tunnel may for example be a GTPv1 tunnel. The MME 401 is connected to the base station 101 and tunnel establishment signaling is transmitted between them. The MME 401 is also connected to the SGW 405 and tunnel establishment signaling is also transmitted between them. When the wireless device 105 enters the first power saving mode, the base station 101 releases all resources associated with the wireless device 105, including the tunnel and its endpoints. In the first power saving mode there is no user data tunnel present on the interface between the base station 101 and the SGW 405. When the wireless device 105 returns to active mode, these resources associated with the wireless device 105 have to be recreated through signalling involving at least the base station 101, the MME 401 and the SGW 405. If the wireless device 105 uses the second power saving mode instead of the first power saving mode, its associated network resources remain active. The signalling impact is therefore very small as the wireless device 105 goes between the second power saving mode and active mode.

Figure 5:
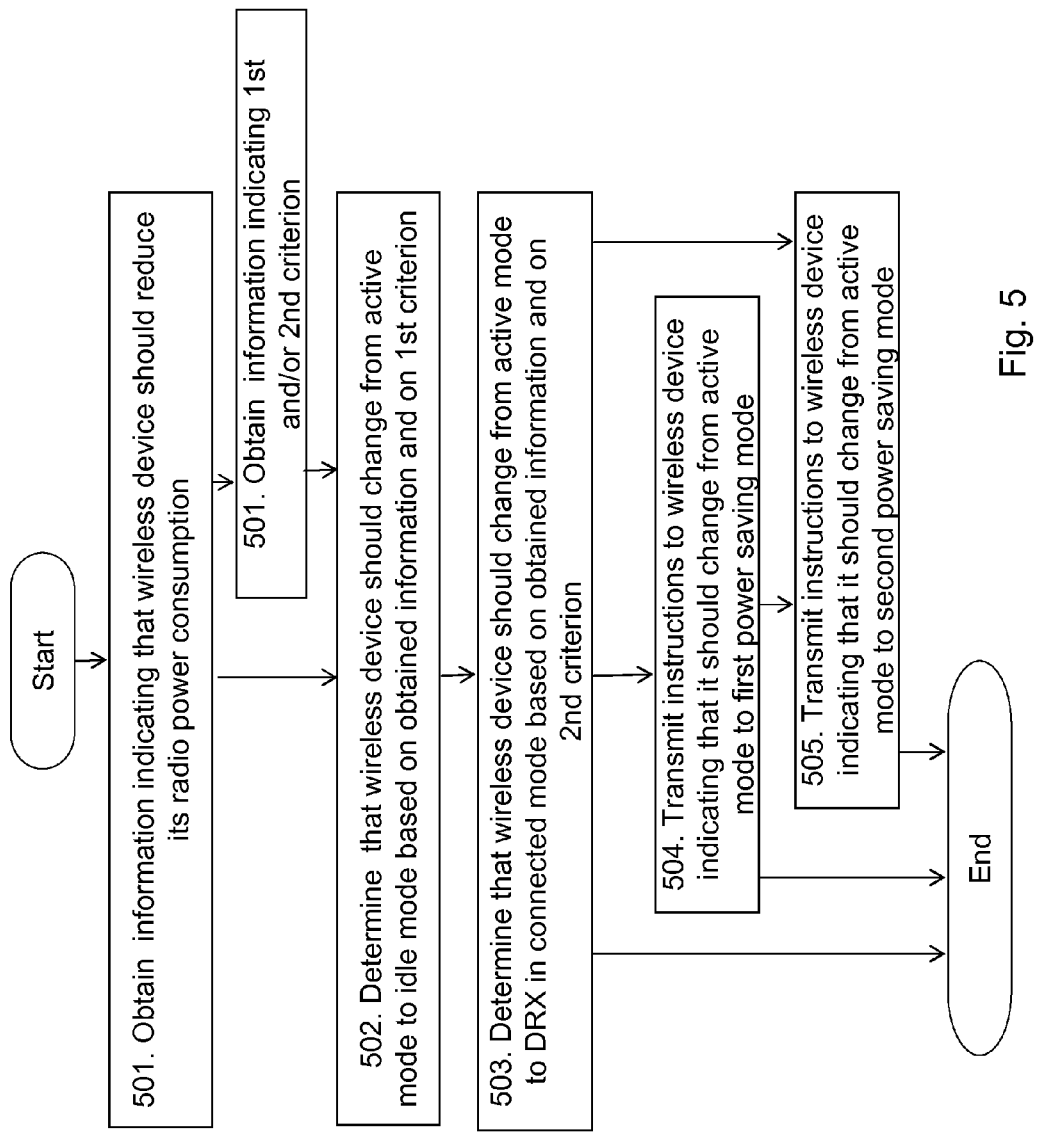
FIG. 5 is a flow chart illustrating embodiments of a method in a network node.

The method described above will now be described seen from the perspective when the node 105, 110 is represented by the network node 110. FIG. 5 is a flowchart describing the present method for handling modes of the wireless device 105. As mentioned above, the node 105, 110 and wireless device 105 are comprised in the wireless network 100, and the wireless device 105 is in active mode at start of the method. The network node 110 may be represented by at least one of for example the MME 401, the base station 101 or the SGW 405. The method comprises the following steps to be performed by the node 105, 110 when it is the network node 110:

Step 501

This step corresponds to step 201 in FIG. 2. The node 105, 110 obtains information indicating that the wireless device 105 should reduce its radio power consumption.

In some embodiments, the information indicating that the wireless device 105 should reduce its radio power consumption is obtained by receiving the information from the wireless device 105.

Step 502

This step corresponds to step 202 in FIG. 2. In some embodiments, the node 105, 110 obtains information indicating at least one of the first criterion and the second criterion.

Step 503

This step corresponds to step 203 in FIG. 2. The node 105, 110 determines that the wireless device 105 should change from active mode to the first power saving mode based on the obtained information and based on a first criterion. The first power saving mode may be idle mode.

In some embodiments, the first criterion is associated with at least one of that the wireless device 105 is associated with a handover within the wireless network 100, a type of wireless device, or a load situation in the wireless network 100. The handover may be a currently ongoing handover, a handover in near future or a recent handover.

Step 504

This step corresponds to steps 202 and 203 in FIG. 2. The node 105, 110 determines that the wireless device 105 should change from active mode to the second power saving mode based on the obtained information and based on a second criterion. The second power saving mode may be DRX in connected mode or URA-PCH in connected mode. The second power saving mode is different from the first power saving mode used in step 503.

In some embodiments, the second criterion is associated with at least one of that that the wireless device 105 is not associated with a handover within the wireless network 100, a type of wireless device, or a load situation in the wireless network 100. The handover may be a currently ongoing handover, a handover in near future or a recent handover Step 505

This step corresponds to step 204 in FIG. 2. In some embodiments, the node 105, 110 transmits instructions to the wireless device 105 indicating that it should change from active mode to the first power saving mode.

Step 506

This step corresponds to step 204 in FIG. 2. Step 506 is an alternative to step 505, i.e. they are not performed at the same time. In some embodiments, the node 105, 110 transmits instructions to the wireless device 105 indicating that it should change from active mode to the second power saving mode, e.g. to DRX in connected mode or URA-PCH in connected mode.

Figure 6:
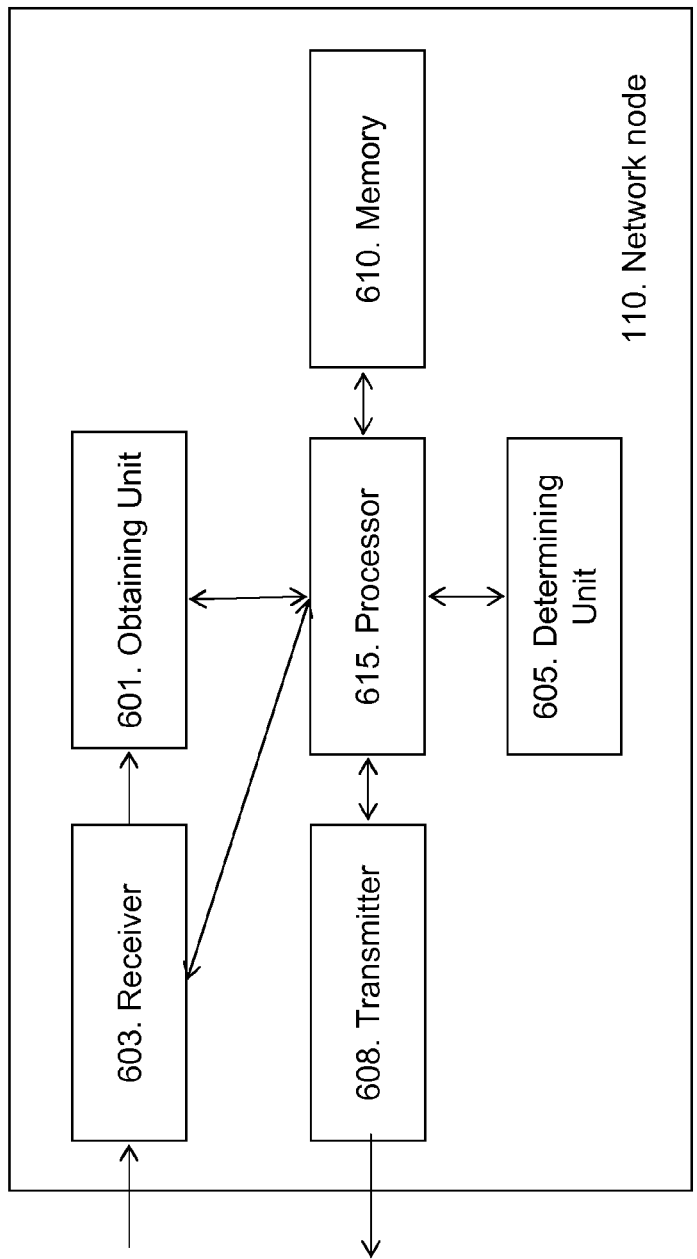
FIG. 6 is a schematic block diagram illustrating embodiments of a network node.

To perform the method steps shown in FIG. 5 for handling modes in the wireless device 105, the node 105, 110 comprises an arrangement as shown in FIG. 6 when the node 105, 110 is represented by the network node 110. As mentioned above, the node 105, 110 and wireless device 105 are comprised in the wireless network 100, and wireless device 105 is in active mode. The network node 110 may be represented by at least one of the MME 401, the base station 101 or the SGW 405.

The node 105, 110 comprises an obtaining unit 601 adapted to obtain information indicating that the wireless device 105 should reduce its radio power consumption. In some embodiments, the obtaining unit 601 is adapted to obtain the information indicating that the wireless device 105 should reduce its radio power consumption by receiving the information from the wireless device 105, for example via a receiver 603. In some embodiments, the obtaining unit 601 is adapted to obtain information indicating at least one of the first criterion and the second criterion.

The node 105, 110 further comprises a determining unit 605 adapted to determine that the wireless device 105 should change from active mode to the first power saving mode based on the obtained information and based on a first criterion, and to determine that the wireless device 105 should change from active mode to the second power saving mode based on the obtained information and based on a second criterion. The first criterion may be associated with at least one of that the wireless device 105 is associated with a handover within the wireless network 100, a type of wireless device, or a load situation in the wireless network 100. The second criterion may be associated with at least one of that that the wireless device 105 is not associated with a handover within the wireless network 100, a type of wireless device, or a load situation in the wireless network 100. The handover may be a currently ongoing handover, a handover in near future or a recent handover. The first power saving mode may be idle mode. The second power saving mode may be DRX in connected mode or URA-PCH in connected mode.

In some embodiments, the node 105, 110 further comprises a transmitter 608 adapted to transmit instructions to the wireless device 105 indicating that it should change from active mode to the first power saving mode, or to transmit instructions to the wireless device 105 indicating that it should change from active mode to the second power saving mode.

The node 105, 110 may further comprise a memory 610 comprising one or more memory units. The memory 605 is arranged to be used to store data, received data information, information indicating that the wireless device 105 should reduce its radio power consumption, information relating to whether the wireless device 105 is moving or substantially not moving, information relating to the modes of the wireless device 105, instructions, threshold values, power saving modes, time periods, configuration, schedulings, and applications to perform the methods herein when being executed in the node 105, 110.

Those skilled in the art will also appreciate that the obtaining unit 601, the determining unit 605, the receiver 603 and the transmitter 608 described above may refer to a combination of analog and digital circuits, and/or one or more processors configured with software and/or firmware, e.g. stored in a memory, that when executed by one or more processors such as the processor 615 perform as described below.

Alternative embodiments of the node 105, 110 when it is the network node 110 may comprise additional components beyond those shown in FIG. 6 that may be responsible for providing certain aspects of the node's 105, 110 functionality, including any of the functionalities described above and/or any functionality necessary to support the embodiments described above.

Figure 7:
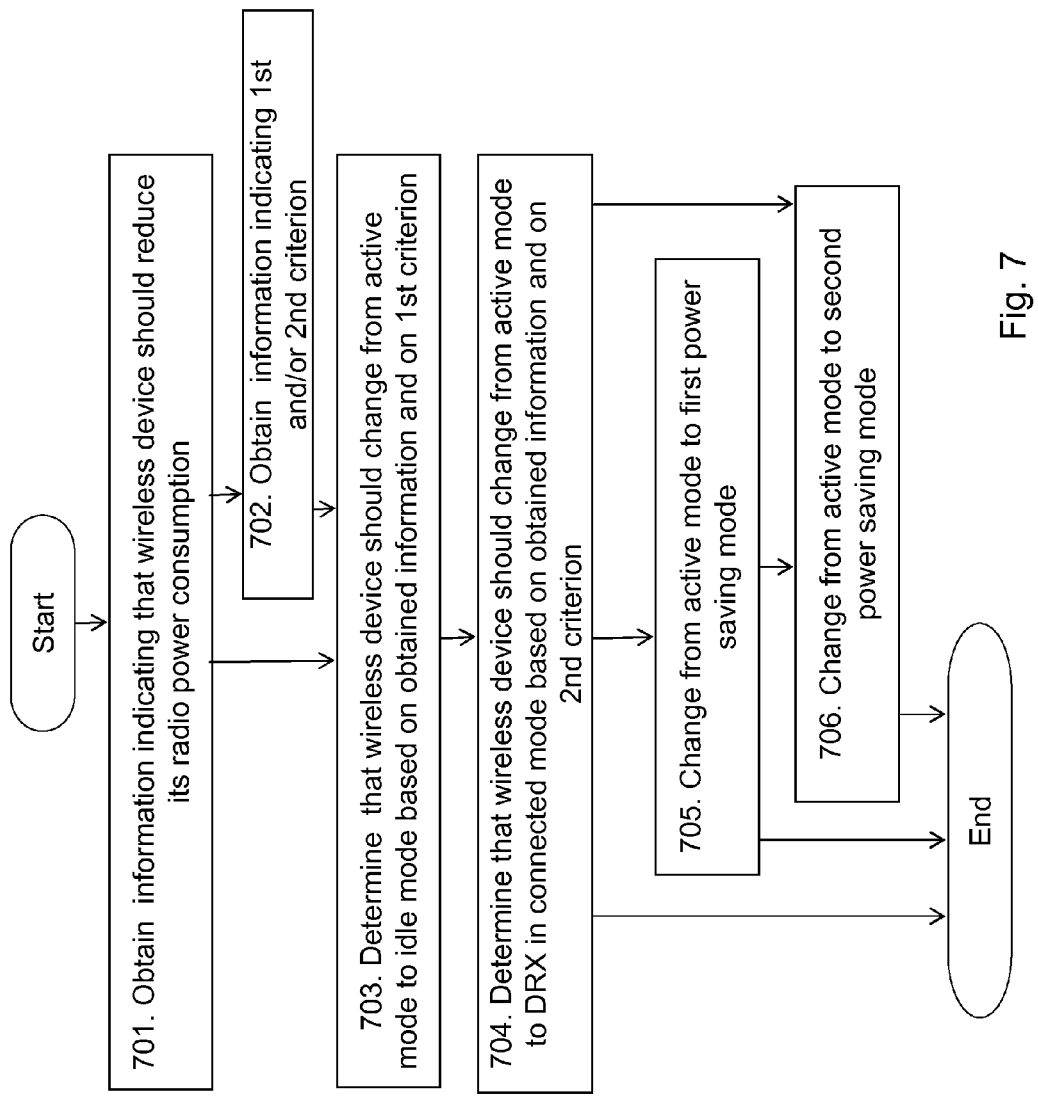
FIG. 7 is a flow chart illustrating embodiments of a method in a wireless device.

The method described above will now be described seen from the perspective of the node 105, 110 when it is the wireless device 105. FIG. 7 is a flowchart describing the present method in the node 105, 110, i.e. the wireless device 105, for handling modes of the wireless device 105. The node 105, 110 and wireless device 105 are comprised in a wireless network 100, and the wireless device 105 is in active mode. The network node 110 may be represented by at least one of the MME, 401, the base station 101 or the SGW 405. The method comprises the following steps to be performed by the node 105, 110, i.e. the wireless device 105:

Step 701

This step corresponds to step 301 in FIG. 3. The node 105, 110 obtains information indicating that the wireless device 105 should reduce its radio power consumption. The information indicating that the wireless device 105 should reduce its radio power consumption may be obtained internally within the wireless device 105.

Step 702

This step corresponds to step 302 in FIG. 3. In some embodiments, the node 105, 110 obtains information indicating at least one of the first criterion and the second criterion either internally within the wireless device 105 or by receiving the information from the network node 110.

Step 703

This step corresponds to step 303 in FIG. 3. The node 105, 110 determines that the wireless device 105 should change from active mode to the first power saving mode based on the obtained information and based on the first criterion. The first criterion may be associated with at least one of that the wireless device 105 is associated with a handover within the wireless network 100, a type of wireless device, or a load situation in the wireless network 100. The first power saving mode may be idle mode. The handover may be a currently ongoing handover, a handover in near future or a recent handover.

Step 704

This step corresponds to steps 302 and 303 in FIG. 3. The node 105, 110 determines that the wireless device 105 should change from active mode to the second power saving mode based on the obtained information and based on the second criterion. The second criterion may be associated with at least one of that that the wireless device 105 is not associated with a handover within the wireless network 100, a type of wireless device, or a load situation in the wireless network 100. The second power saving mode may be DRX in connected mode or URA-PCH in connected mode. The second power saving mode is different from the first power saving mode used in step 703. The handover may be a currently ongoing handover, a handover in near future or a recent handover.

Step 705

This step corresponds to step 205 in FIG. 2 and step 304 in FIG. 3. In some embodiments, the node 105, 110 changes from active mode to the first power saving mode, when the node 105, 110 is represented by the wireless device 105.

Step 706

This step corresponds to step 205 in FIG. 2 and step 304 in FIG. 3. In some embodiments, the node 105, 110 changes from active mode to the second power saving mode, e.g. DRX in connected mode or URA-PCH in connected mode, when the node 105, 110 is represented by the wireless device 105.

Figure 8:
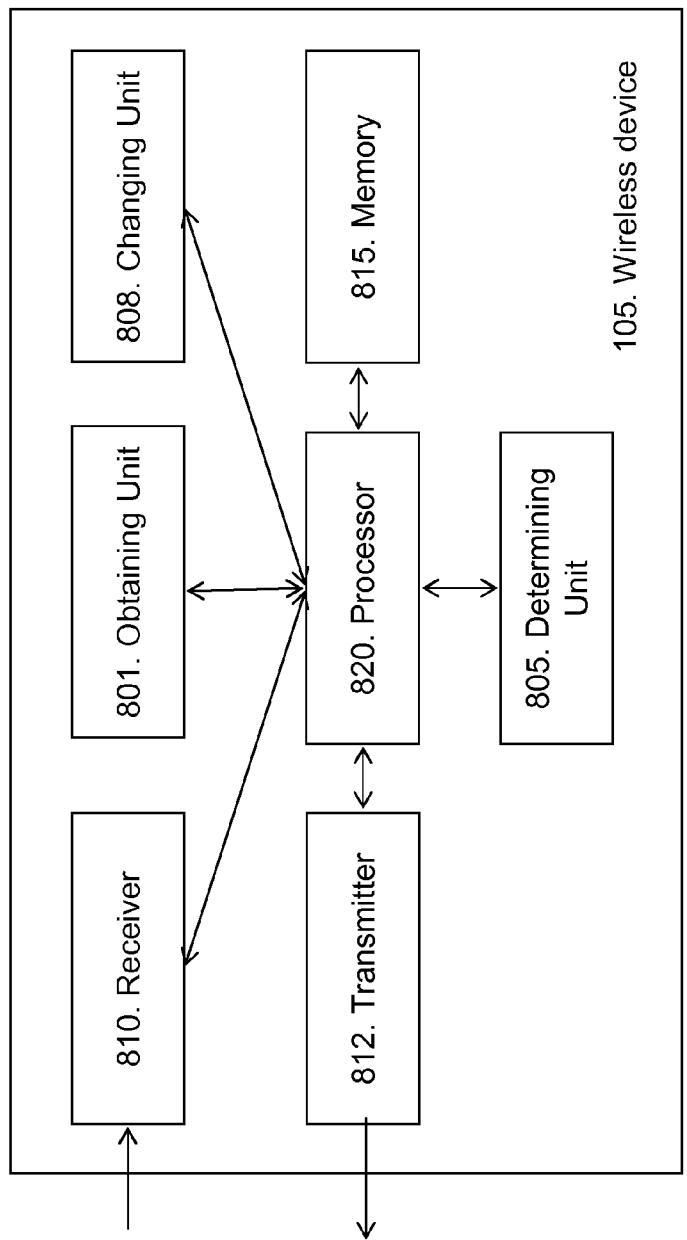
FIG. 8 is a schematic block diagram illustrating embodiments of a wireless device.

To perform the method steps shown in FIG. 7 for handling modes in the wireless device 105 the node 105, 110 comprises an arrangement as shown in FIG. 8 when the node 105, 110 is represented by the wireless device 105. The node 105, 110 and wireless device 105 are comprised in the wireless network 100. The wireless device 105 is in active mode. The network node 110 may be represented by at least one of the MME 401, the base station 101 or the SGW 405.

The node 105, 110 comprises an obtaining unit 801 adapted to obtain information indicating that the wireless device 105 should reduce its radio power consumption. In some embodiments, the obtaining unit 801 is adapted to obtain the information indicating that the wireless device 105 should reduce its radio power consumption internally within the wireless device 105. In some embodiments, the obtaining unit 801 is further adapted to obtain information indicating at least one of the first criterion and the second criterion. The obtaining unit 801 may be further adapted to obtain the information indicating the at least one of the first criterion and the second criterion by receiving it from the network node 110, for example via a receiver.

The node 105, 110 comprises a determining unit 805 adapted to determine that the wireless device 105 should change from active mode to the first power saving mode based on the obtained information and based on the first criterion, and to determine that the wireless device 105 should change from active mode to the second power saving mode based on the obtained information and based on the second criterion. The first criterion may be associated with at least one of that the wireless device 105 is associated with a handover within the wireless network 100, a type of wireless device, or a load situation in the wireless network 100. The second criterion may be associated with at least one of that that the wireless device 105 is not associated with a handover within the wireless network 100, a type of wireless device, or a load situation in the wireless network 100. The first power saving mode may be idle mode. The second power saving mode may be DRX in connected mode or URA-PCH in connected mode.

In some embodiments, the node 105, 110 further comprises a changing unit 808 adapted to change from active mode to the first power saving mode, or to change from active mode to the second power saving mode.

In some embodiments, the receiver 810 is further adapted to receive instructions from the network node 110 indicating that it should change from active mode to the first power saving mode or to receive instructions from the network node 110 indicating that it should change from active mode to the second power saving mode.

In some embodiments, the node 105, 110 further comprises a transmitter 812 transmit any necessary information to the network node 110 at any suitable time.

The node 105, 110 may further comprise a memory 815 comprising one or more memory units. The memory 815 is arranged to be used to store data, received data information, information indicating that the wireless device 105 should reduce its radio power consumption, information relating to whether the wireless device 105 is moving or substantially not moving, information relating to the modes of the wireless device 105, instructions, threshold values, time periods, configurations, schedulings, and applications to perform the methods herein when being executed in the node 105, 110 when it is the wireless device 105.

Those skilled in the art will also appreciate that the obtaining unit 801, the determining unit 805, the changing unit 808, the receiver 810 and the transmitter 812 described above may refer to a combination of analog and digital circuits, and/or one or more processors configured with software and/or firmware, e.g. stored in a memory, that when executed by the one or more processors such as the processor 820 perform as described below.

Alternative embodiments of the node 105, 110 when it is the wireless device 105 may comprise additional components beyond those shown in FIG. 8 that may be responsible for providing certain aspects of the node's 105, 110 functionality, including any of the functionalities described above and/or any functionality necessary to support the embodiments described above.

The present mechanism for handling modes of the wireless device 105 in the wireless network 100 may be implemented through one or more processors, such as a processor 615 in the network node arrangement depicted in FIG. 6 when the node 105, 110 is represented by the network node 110 and a processor 820 in the wireless device arrangement depicted in FIG. 8 when the node 105, 110 is represented by the wireless device 105, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the node 105, 110, i.e. the network node 110 and/or wireless device 105. One such carrier may be in the form of a CD ROM disc. It is however feasible with other data carriers such as a memory stick. The computer program code may furthermore be provided as pure program code on a server and downloaded to the node 105, 110, i.e. the network node 110 and/or wireless device 105.

The embodiments herein are not limited to the above described embodiments. Various alternatives, modifications and equivalents may be used. Therefore, the above embodiments should not be taken as limiting the scope of the embodiments, which is defined by the appending claims.

The term "adapted to" used herein may also be referred to as "arranged to" or "configured to".

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method for handling modes in a wireless device having a device type, which wireless device is comprised in a wireless network, the method comprising:
   when the wireless device is in an active mode, obtaining first information indicating that the wireless device should reduce its power consumption;
   obtaining second information for use in selecting a power saving mode for the wireless device, wherein the second information indicates at least one of: i) whether or not the wireless device has been handed over from one network access node to another network access node since a prior point in time, and ii) whether or not a load in the wireless network exceeds a load threshold;
   using the obtained second information, performing at least one of: i) determining whether the wireless device has been handed over from one network access node to another network access node since the prior point in time and ii) determining whether the load in the wireless network exceeds the load threshold;
   as a result of obtaining said first information indicating that the wireless device should reduce its power consumption, selecting a power saving mode for the wireless device, wherein
   selecting the power saving mode for the wireless device comprises selecting one of a first power saving mode and a second power saving mode based on the obtained second information, and
   selecting one of the first and second power saving modes based on the obtained second information comprises one of: i) selecting the first power saving mode as a result of determining that a) the wireless device has been handed over from one network access node to another network access node since the prior point in time or b) the determined load is below the load threshold and ii) selecting the second power saving mode as a result of determining that the determined load is above the load threshold, and further wherein the method further comprises at least one of:
   a network node transmitting instructions to the wireless device indicating that the wireless device should change from the active mode to the selected power saving mode, and
   the wireless device changing from the active mode to the selected power saving mode.

2. The method of claim 1, wherein a network node performs the obtaining and selecting steps and the method further comprises:
   the network node transmitting instructions to the wireless device indicating that it should change from the active mode to the selected power saving mode.

3. The method of claim 2, wherein the step of obtaining the first information indicating that the wireless device should reduce its power consumption comprises receiving, at the network node, the first information from the wireless device.

4. The method of claim 1, wherein the method further comprises:
   in response to the selection of the power saving mode, the wireless device changing from the active mode to the selected power saving mode.

5. The method of claim 1, wherein
   the second information indicates whether or not the wireless device has been handed over from one network access node to another network access node since a prior point in time,
   selecting one of the first and second power saving modes based on the obtained second information comprises one of: i) selecting the first power saving mode as a result of determining that the wireless device has been handed over from one network access node to another network access node since a prior point in time and ii) selecting the second power saving mode as a result of determining that the wireless device is not associated with any handover.

6. The method of claim 1, wherein the obtaining and selecting steps are performed by the wireless device.

7. The method of claim 1, wherein the obtained second information indicates the device type of the wireless device.

8. The method of claim 1, wherein
   the obtained second information indicates at least one of:
   a) the device type of the wireless device, and
   b) a network load in the wireless network.

9. The method of claim 1, wherein
   the second information indicates whether or not a load in the wireless network exceeds a load threshold,
   the method comprises using the second information to determine whether the load in the wireless network exceeds the load threshold, and
   selecting one of the first and second power saving modes based on the obtained second information comprises one of: i) selecting the first power saving mode as a result of determining that the load in the wireless network is below the load threshold and ii) selecting the second power saving mode as a result of determining that the load in the wireless network is above the load threshold.

10. The method of claim 1, wherein the method is performed by a Mobility Management Entity, a base station, or a Serving GateWay.

11. The method of claim 1, wherein
the first power saving mode is an idle mode, and
the second power saving mode is one of: i) a discontinuous reception (DRX) in connected mode and ii) a Universal Terrestrial Radio Access Network Registration Area Paging Channel (URA-PCH) in connected mode.

12. A node for handling power saving modes of a wireless device, the node comprising:
a transmitter;
a receiver;
a memory; and
one or more processors coupled to the memory, transmitter and the receiver, wherein the one or more processors are configured to:
when the wireless device is in an active mode, obtain first information indicating that the wireless device should reduce its power consumption;
obtain second information for use in selecting a power saving mode for the wireless device, wherein the second information indicates at least one of: i) whether or not the wireless device has been handed over from one network access node to another network access node since a prior point in time and ii) whether or not a load in the wireless network exceeds a load threshold; and
as a result of obtaining said first information, select a power saving mode for the wireless device, wherein selecting the power saving mode for the wireless device comprises selecting one of a first power saving mode and a second power saving mode based on the obtained second information, wherein selecting one of the first and second power saving modes based on the obtained second information comprises one of: i) selecting the first power saving mode as a result of determining that a) the wireless device has been handed over from one network access node to another network access node since the prior point in time or b) the determined load is below the load threshold and ii) selecting the second power saving mode as a result of determining that the determined load is above the load threshold.

13. The node of claim 12, wherein the node further comprises:
a transmitter operable to:
transmit instructions to the wireless device indicating that it should change from the active mode to the selected power saving mode.

14. The node of claim 12, wherein the one or more processors are configured to change from the active mode to the selected power saving mode after selecting the power saving mode.

15. The node of claim 12, wherein
the second information indicates whether or not the wireless device has been handed over from one network access node to another network access node since a prior point in time,
selecting one of the first and second power saving modes based on the obtained second information comprises one of: i) selecting the first power saving mode as a result of determining that the wireless device has been handed over from one network access node to another network access node since a prior point in time and ii) selecting the second power saving mode as a result of determining that the wireless device is not associated with any handover.

16. The node of claim 12, wherein the node is a wireless device.

17. The network node of claim 12, wherein the node is a network node.

18. The node of claim 12, wherein the obtained second information indicates the device type of the wireless device.

19. The node of claim 12, wherein
the obtained second information indicates at least one of:
a) the device type of the wireless device, and
b) a network load in the wireless network.

20. The node of claim 12, wherein
the second information indicates whether or not a load in the wireless network exceeds a load threshold,
the node is configured to use the second information to determine whether the load in the wireless network exceeds the load threshold, and
the node is configured to select one of the first power saving mode and second power saving mode based on the obtained second information by performing a process comprising one of: i) selecting the first power saving mode as a result of determining that the load in the wireless network is below the load threshold and ii) selecting the second power saving mode as a result of determining that the load in the wireless network is above the load threshold.

21. The node of claim 12, wherein the node is one of a Mobility Management Entity, a base station, and a Serving GateWay.

* * * * *